Nov. 30, 1926. 1,608,519
S. J. NORDSTROM
VALVE
Filed Feb. 10, 1925    3 Sheets-Sheet 1

INVENTOR
Sven Johan Nordstrom
Archibald Cox
his ATTORNEY

Nov. 30, 1926.

S. J. NORDSTROM 1,608,519

VALVE

Filed Feb. 10, 1925     3 Sheets-Sheet 3

INVENTOR
Sven Johan Nordstrom
BY Archibald Cox
his ATTORNEY

Patented Nov. 30, 1926.

1,608,519

UNITED STATES PATENT OFFICE.

SVEN JOHAN NORDSTROM, OF SARATOGA, CALIFORNIA, ASSIGNOR TO MERCO NORDSTROM VALVE COMPANY, OF SAN FRANCISCO, CALIFORNIA, A CORPORATION OF DELAWARE.

VALVE.

Application filed February 10, 1925. Serial No. 8,096.

The invention relates to valves and more particularly to valves of the type known as lubricated valves.

Lubricated valves are provided with means for supplying lubricant to the contact joint or friction surface between the valve proper or movable member of the valve and the valve seat formed in the casing. The lubrication is usually effected by forming lubricating channels at the contact joint between the valve proper and the valve seat and forcing lubricant into the channels. Obviously these channels may be located in the bearing surface of the valve proper or in the bearing surface of the valve seat or in both, depending upon the type of valve in hand and mechanical considerations. The term lubricating channel or channels located at the contact joint includes any or all of these arrangements. One of the difficulties encountered in properly lubricating valves of this type is the fact that the high temperatures and chemicals to which the valves are sometimes subjected tend to harden the lubricant and so clog up the lubricating channels.

The object of the present invention is to provide valves with means for positively effecting proper lubrication of the contact joint between the movable member of the valve and the valve seat in the casing. This improved lubricating means consists in the provision of means for causing a flow or circulation of the lubricant through the lubricating channels by forcing lubricant into one end of the channel or channels and withdrawing a portion of the lubricant from the other end of the channel or channels. By this means a free flow of fresh lubricant through the lubricating channels is assured and proper lubrication and sealing of the bearing surfaces of the valve thereby made possible. The invention is more fully described hereinafter and is particularly pointed out in the appended claims.

Figure 1:
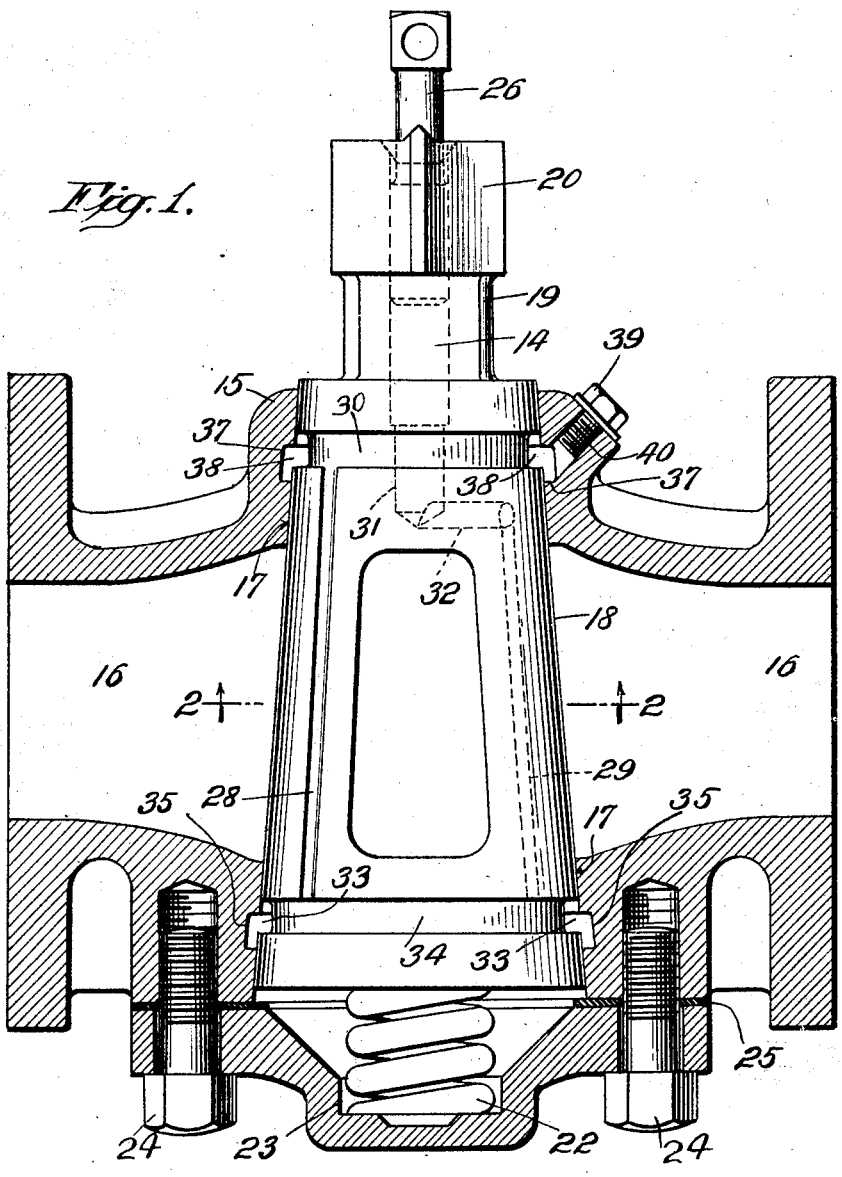
Figure 2:
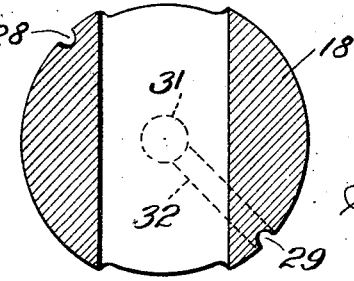
Figure 3:
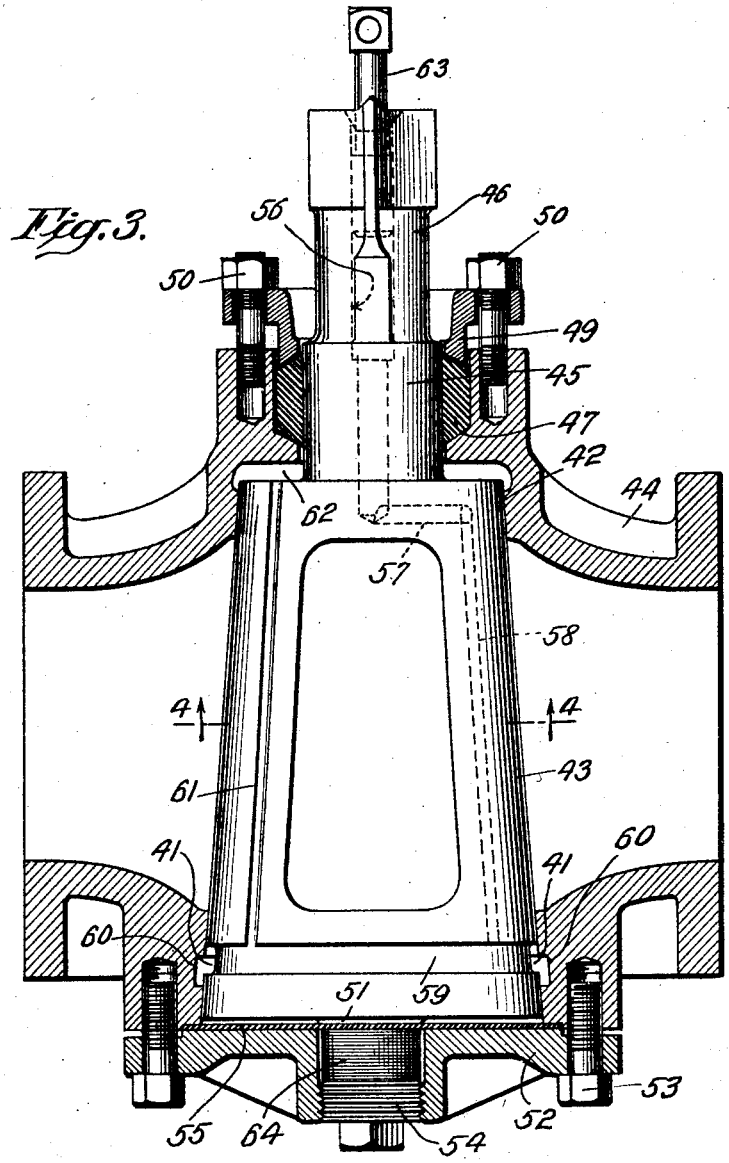
Figure 4:
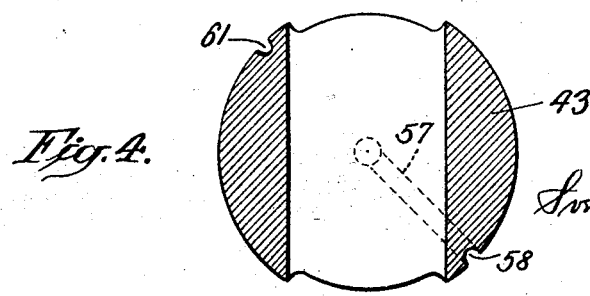
Figure 5:
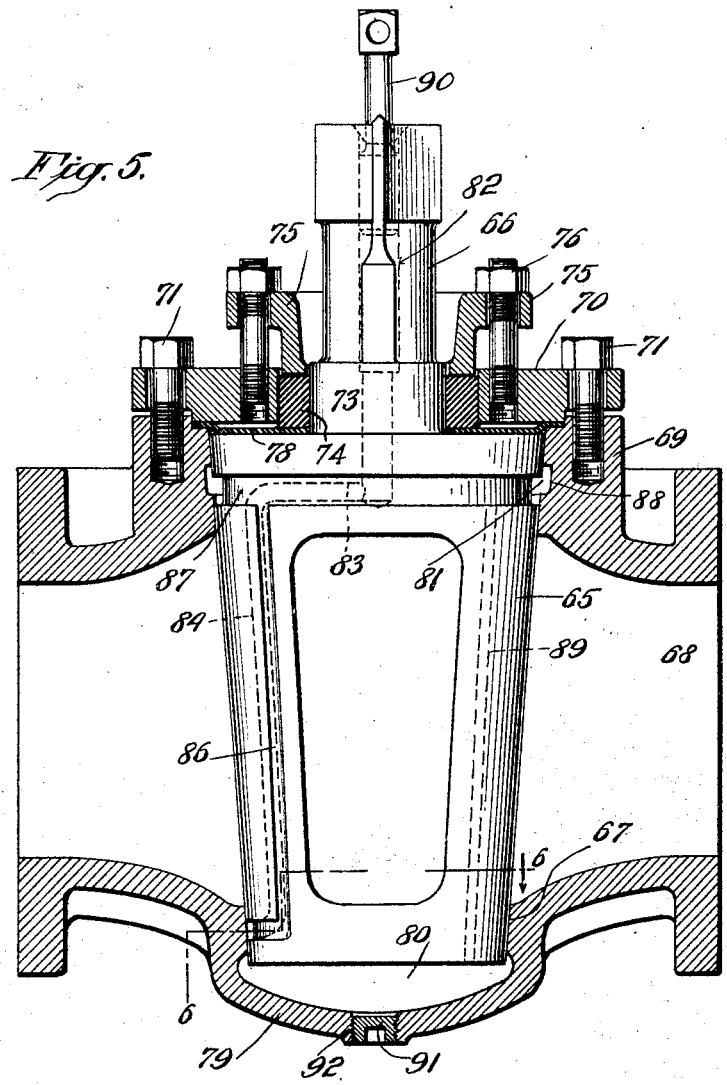
Figure 7:
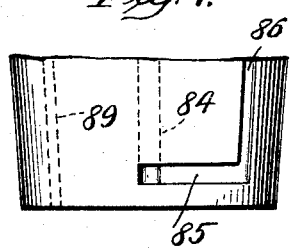
Figure 6:
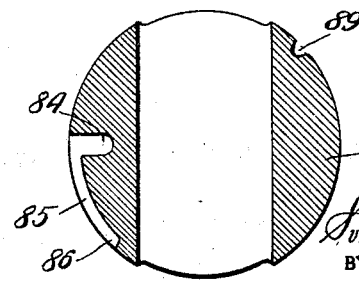

In the accompanying drawings the invention is shown embodied in various types of plug valves: Fig. 1 is a longitudinal section taken through a plug valve having the valve stem at the small end of the plug; Fig. 2 is a section taken on the line 2—2 of Fig. 1; Fig. 3 is a longitudinal section through another form of the type of valve shown in Fig. 1; Fig. 4 is a section taken on the line 4—4 of Fig. 3; Fig. 5 is a longitudinal section through a plug valve of the type having the valve stem at the larger end of the plug; Fig. 6 is a section taken on the line 6—6 of Fig. 5; and Fig. 7 is a detail view of the lower end of one side of the plug shown in Fig. 5.

In the form of valve shown in Figs. 1 and 2 the valve comprises a valve casing 15 having a longitudinal passageway 16 therethrough and a tapered valve seat 17 in which is seated a tapered plug 18 having a valve stem 19 extending from the smaller end of the plug, the extremity 20 of the stem being squared to accommodate a wrench. The plug 18 is yieldingly held against its seat by means of a coiled spring 22 interposed between the larger end of the plug and the cap 23 secured to the casing 15 by the cap screws 24. A gasket 25 provides a tight joint between the casing and the cap 23. These parts may be as usual in valves of this type.

The lubricating system for this type of valve comprises a reservoir 14 formed in the stem 19 for containing the lubricant which is to be spread over the bearing surfaces of the valve seat 17 and the plug 18. For this purpose there is provided in the surface of the plug the longitudinal lubricating channels or grooves 28 and 29. The upper end of the channel 29 terminates below the circumferential groove 30 formed in the smaller end of the plug and is connected with the lower end 31 of the reservoir by a radial hole 32. The lower end of the channel 29 communicates with a circumferential groove 34 formed in the larger end of the plug 18. In the adjacent part of the valve casing is a corresponding circumferential groove 35 with which the groove 34 forms the lubricant chamber 33. The lower end of the channel 28 connects with the groove 34 and the upper end of the channel 28 connects with the groove 30 formed in the smaller end of the plug. In the adjacent part of the valve casing is a corresponding circumferential groove 37 which with the groove 30 forms the lubricant chamber 38.

The above described construction and arrangement of parts are such that when the screw 26 in the upper end of the stem is turned to put the lubricant in the reservoir 14 under pressure, the lubricant is first forced down the channel 29 into the chamber 33 and then passes up through the channel 28 into the chamber 38. The vertical component of the force exerted on the lubricant in the chambers 33 and 38 is sufficient to lift the plug from its seat against the action of the spring 22. By lifting the plug from its seat the lubricant in the channels 28 and 29 exudes laterally along the edges of the channels so that when the plug is turned the seating surfaces of the plug and the casing are smeared with a film of lubricant and so effectively lubricated and sealed.

In order to assure a free flow of lubricant down the channel 29 into the chamber 33 and up through the channel 28 into the chamber 38, there is provided a threaded plug 39 which normally closes an outlet 40 formed in the part of the casing adjacent the smaller end of the plug. When the plug 39 is removed the lubricant under pressure from the reservoir 14 is forced out through the outlet. By removing the plug 39 from time to time and noticing that lubricant extrudes through the outlet when screw 26 is turned down, the operator is assured that the lubricating channels of the valve are free and that the seating surfaces may be properly lubricated.

The valve shown in Fig. 3 is substantially the same in construction and mode of operation as the valve shown in Fig. 1. The valve shown in Fig. 1 is usually employed for the sizes up to 4 inches, whereas the valve shown in Fig. 3 is usually employed for valves larger than 4 inches. The valve shown in Fig. 3 differs from the valve shown in Fig. 1 in that the smaller end 42 of the valve plug 43 terminates within the casing 44 and that the shank 45 of the valve stem 46 is surrounded by a packing 47 which is held in place by the gland 49 removably secured to the casing by the studs and nuts 50. The larger end of the plug 43 is provided with a central boss 51 which bears against the center of a metal washer 55 held between the casing and the cap 52. A plug 54 screwed into a central boss in the cap 52 bears against the resilient washers 64 which are forced against the other side of the center of the washer 55 so as to resiliently force the plug 43 against its seat.

The means for lubricating the valve shown in Fig. 3 comprises a reservoir 56 formed in the valve stem 46. The lower end of the reservoir 56 connects by means of the radial hole 57 with the lubricating groove or channel 58 formed longitudinally in one face of the plug, the lower end of which channel connects with the circumferential groove 59 formed in the larger end of the plug. In the adjacent part of the valve casing is a circumferential groove 60 which with the groove 59 forms a lubricant chamber 41. From the groove 59 a lubricating groove or channel 61 passes up the opposite face of the plug 43 to the chamber 62 formed between the smaller end of the plug and the adjacent part of the casing. The outlet from the channel 61 and the chamber 62 is around the shank of the stem 46 when the gland 49 is loosened for that purpose.

By turning the screw 63 in the end of the stem the lubricant in the reservoir 56 is put under pressure to force the lubricant through the channel 58 into the chamber 41 and up through the channel 61 into the chamber 62 to lift the plug from its seat in order that the contact joint between the plug and the casing may be properly lubricated. The operator is assured of a free flow of lubricant through the channels 58 and 61 by loosening the gland 49 and turning down the screw 63 to ascertain whether there is an outflow of lubricant from the chamber 62 around the shank of the stem 46.

In the form of valve shown in Fig. 5 the position of the plug 65 is reversed, that is to say, the valve stem 66 is connected with the larger end of the plug. In this form of valve the plug is held in place against the valve seat 67 formed transversely of the passageway 68 through the casing 69 by means of a cap 70 removably held in place against the upper side of the casing 69 by cap screws 71. The valve stem 66 projects upwardly through a central hole in the cap 70 and the shank 73 of the valve stem is surrounded by the packing 74 which is compressed and held in place by the gland 75 removably secured to the cap plate 70 by the studs and nuts 76. Superposed upon the larger end of the plug and extending from the base 73 of the valve stem 66 outwardly and overlapping the joint between the larger end of the plug and the adjacent part of the casing 69 is a washer or gasket 78. Between the smaller end of the plug 65 and the adjacent part 79 of the casing is a lubricant chamber 80.

The means for lubricating the valve shown in Fig. 5 comprises a lubricant reservoir 82 formed in the valve stem 66. The lower end of the reservoir 82 is connected by means of the radial hole 83 with the upper end of a vertical hole 84 formed wholly within the body part of the plug 65. The lower end of the hole 84 communicates with a transverse groove 85 formed in the lower end of one side of the plug 65. The transverse groove 85 serves to connect the lower end of the hole 84 with the lower end of a groove or channel 86 formed longitudinally in one side of the seating surface of the plug 65. The upper end of the channel 86 communicates with a circumferential groove 87 formed in the larger end of the plug. The groove 87 and a corresponding circumferential groove 88 in the adjacent part of the casing 69 form a lubricant chamber 81 which is connected with the chamber 80 by means of the lubricating groove or channel 89 formed in the surface of the side of the plug opposite to the channel 86.

By turning the screw 90 in the end of the stem 66 the lubricant is forced out of the reservoir 82 through the holes 83 and 84 down into the transverse groove 85 and thence through the lubricating channel 86 into the chamber 81, from whence it passes through the lubricating channel 89 into the chamber 80. When sufficient pressure is put on the screw 90 the compression of the lubricant in the chamber 80 and in the chamber 81 lifts the plug 65 slightly from its seat, thereby permitting the lubricant to exude laterally along the edges of the lubricating channels 86 and 89 so that when the plug is turned the seating surfaces of the plug and the casing will be smeared with a film of lubricant. In this form of valve the operator can ascertain whether there is a free flow of lubricant through the lubricating channels, and that therefore the bearing surfaces of the valve will be properly lubricated, by unscrewing the plug 91 which normally closes an outlet passage 92 in the bottom of the casing 69 under the chamber 80. It will be understood that if the passageways are clogged, the lubricant in the chamber 80 will not extrude from the outlet 92 when the screw 90 is turned inward.

The invention has been shown and described as particularly applicable to valves of the plug cock type. It will be understood, however, that the invention is also applicable to such types of valves as gate valves, globe valves, various types of valves particularly adapted for tank car service, and other types of valves in which the valve comprises a casing having a passageway therethrough, a valve seat formed transversely across or interposed in the passageway and a movable member adapted to seat against the valve seat to control the passageway.

Having thus described the invention, what I claim as new is:—

1. A valve comprising a casing having a passageway therethrough, a plug seated in the casing and having a hole adapted to register with the passageway, and means for lubricating the contact joint between the plug and the casing consisting of a reservoir in the plug for containing lubricant, means for putting the lubricant in the reservoir under pressure, a lubricant chamber formed between the larger end of the plug and the adjacent part of the casing, a lubricant chamber formed between the smaller end of the plug and the adjacent part of the casing, a lubricating channel formed in the surface of the plug having one end connected with the reservoir and the other end connected with the first lubricant chamber, a second lubricating channel in the plug having one end connected with the first lubricant chamber and the other end connected with the second lubricant chamber, an outlet connected with the second lubricant chamber, and means for normally closing the outlet.

2. A valve comprising a casing having a passageway therethrough and a tapered valve seat arranged transversely across the passageway, a tapered plug adapted to be seated in the valve seat and having a hole adapted to register with the passageway, and means for lubricating the contact joint between the plug and the casing consisting of two oppositely disposed longitudinal lubricating channels formed in the bearing surface of the plug, a reservoir containing lubricant located in the plug and having a connection with one end of one of the lubricating channels, a connection between the other end of this lubricating channel and one end of the other lubricating channel, an outlet, normally closed, connected with the other end of the second lubricating channel, and means for putting the lubricant in the reservoir under pressure to cause it to flow through the channels and out through the outlet when the latter is opened.

3. A valve comprising a casing having a passageway therethrough, a plug seated in the casing and having a hole adapted to register with the passageway, the contact joint between the plug and the casing being provided with lubricating channels, and means for causing a flow of lubricant first through one channel and then through the other, consisting of a reservoir for containing lubricant connected with one end of the first channel, a connection between the other end of the first channel and one end of the second channel, an outlet connected with the other end of the second channel, means for normally closing the outlet, and means for putting the lubricant in the reservoir under pressure to cause the lubricant to flow through the channels and out through the outlet when the latter is opened.

4. A valve comprising a casing having a passageway therethrough and a tapered valve seat, a tapered plug seated in the valve seat and having a hole adapted to register with the passageway, the contact joint between the plug and the casing being provided with a plurality of lubricating channels, the discharge end of one channel being connected with the inlet end of the next succeeding channel, and means for causing a flow of lubricant consecutively through the channels comprising a reservoir connected with the inlet end of the first channel, an outlet connected with the outlet end of the last channel, means for normally closing the outlet, and means for putting the lubricant in the reservoir under pressure.

SVEN JOHAN NORDSTROM.